July 4, 1939. C. A. SNIDER 2,164,844
BRAKE
Filed May 7, 1937 2 Sheets-Sheet 2

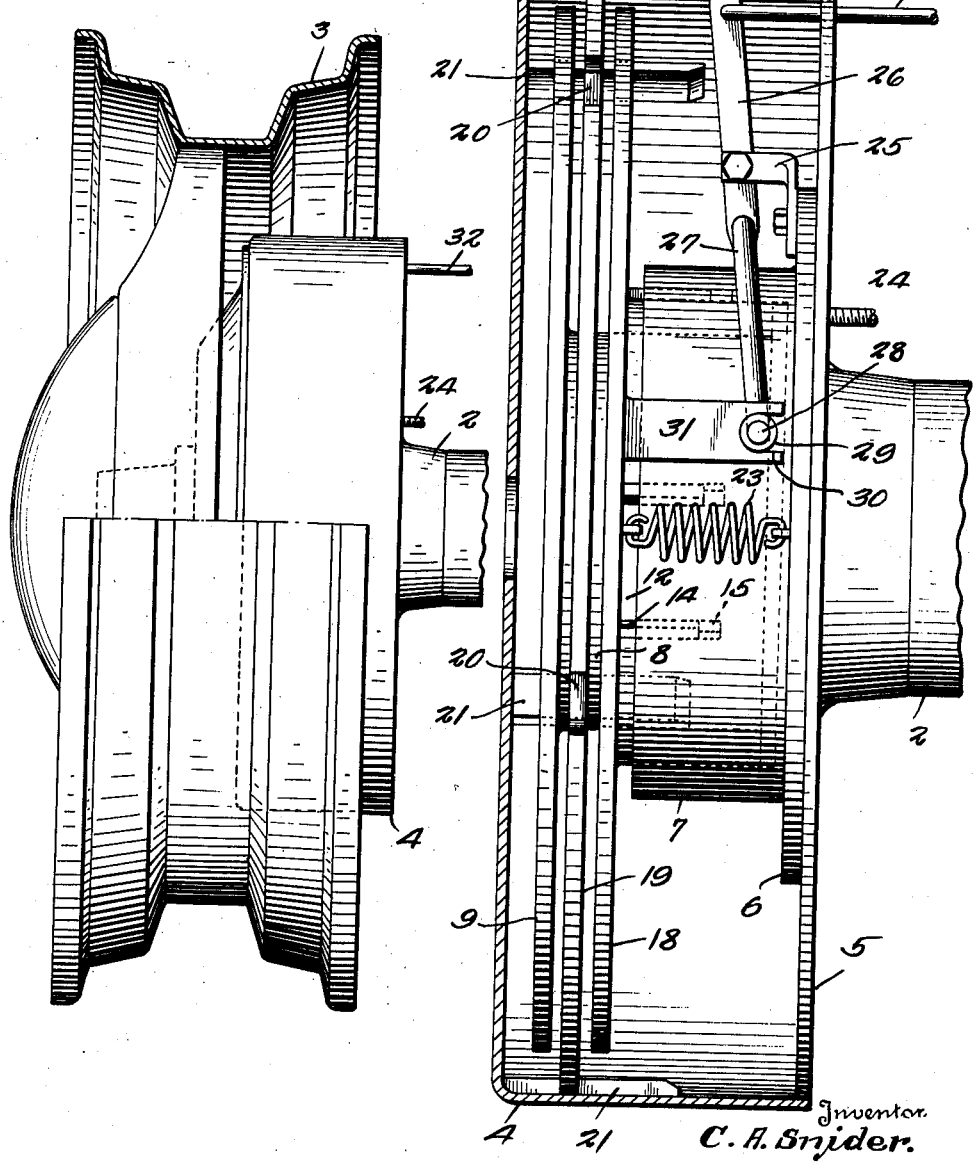

Inventor
C. A. Snider.
By CASnow&Co.
Attorneys.

Patented July 4, 1939

2,164,844

UNITED STATES PATENT OFFICE 2,164,844

BRAKE

Chester A. Snider, Huntington, Tex., assignor of one-half to John S. Redditt, Lufkin, Tex.

Application May 7, 1937, Serial No. 141,334

1 Claim. (Cl. 188—72)

This invention relates to a brake for motor vehicles, one of the objects being to provide a brake which can be installed readily in any type of vehicle whether the brake is to be operated by fluid, air or vacuum.

A further object is to provide a brake having the maximum braking area.

A further object is to provide a brake the construction of which is such that all foreign substances will be discarded therefrom by centrifugal force.

Another object is to provide a brake having supplemental operating means.

A still further object is to provide a brake which can be quickly assembled or taken apart and which will not readily get out of order.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 1 is a view partly in elevation and partly in section of a wheel equipped with the brake constituting the present improvement.

Figure 2 is an enlarged section through the brake housing, the brake mechanism therein being shown in elevation.

Figure 3:
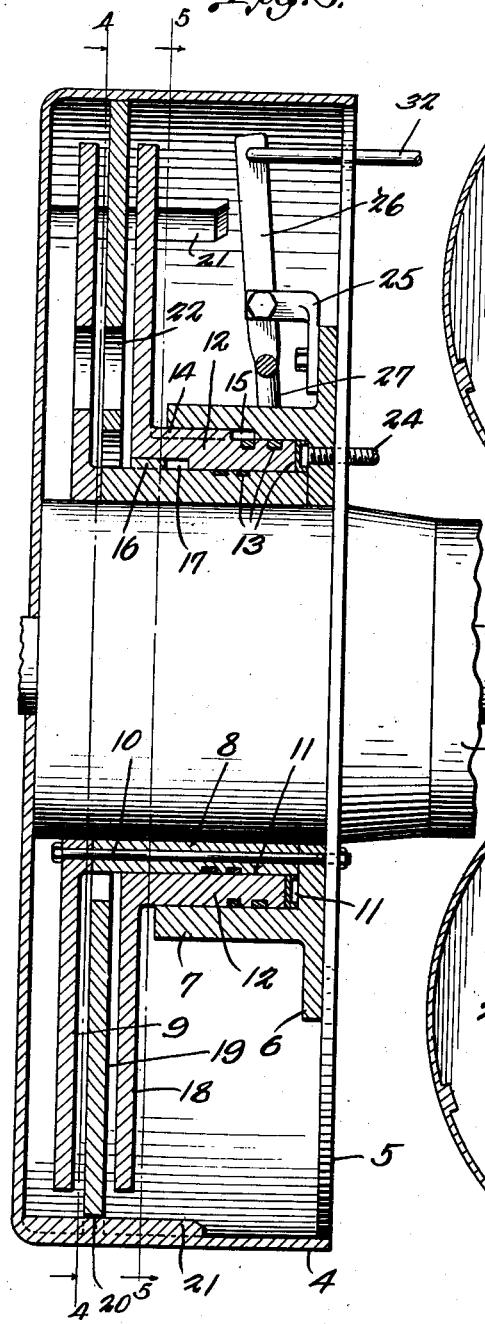
Figure 3 is a similar view, the brake mechanism being in section.
Figure 4:
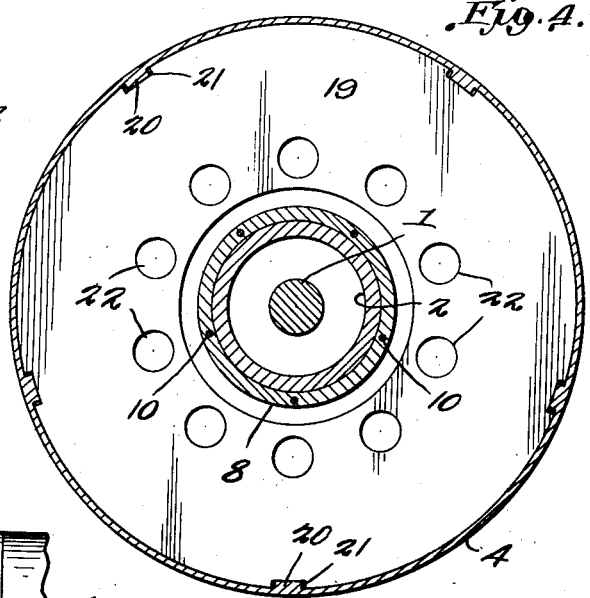
Figure 4 is a section on a reduced scale taken on the line 4—4, Figure 3.

Referring to the figures by characters of reference 1 designates the axle drive shaft of a motor vehicle arranged within an axle housing 2 and adapted to drive a wheel 3 of ordinary construction. Secured to the wheel in the usual or any preferred manner is a brake drum 4 one side of which is closed by a flange 5 formed on or secured to the axle housing 2.

Located within the drum 4 and mounted on the inner surface of the flange 5 is a ring 6 from which is extended a barrel 7 projecting partly across the interior of the drum 4 and spaced from but concentric with the axle housing 2. A sleeve 8 is fitted snugly on the axle housing and abuts at one end against ring 6, the other end of this sleeve abutting against a stationary brake disk 9. Disk 9, sleeve 8 and ring 6 are all fixedly connected in any suitable manner, as by means of bolts 10 which can also be employed for the purpose of securing these parts fixedly to the flange 5.

The barrel 7 and sleeve 8 cooperate to provide an annular chamber 11 between them in which is slidably mounted a tubular piston 12 provided with any desired arrangement of packing 13 whereby leakage of fluid or gas along the piston is prevented.

Piston 12 is held against rotation relative to its cylinder or barrel 7 by means of one or more lugs 14 slidable within longitudinal grooves 15 in said cylinder or barrel 7 and also by means of one or more lugs 16 on sleeve 8 which project into longitudinal grooves 17 in the piston.

That end of the piston projecting beyond the barrel or cylinder 7 is formed with a slidable brake disk 18 which is parallel with disk 9 but spaced therefrom a sufficient distance to receive between them a rotary brake disk 19 formed of fiber or any other suitable material. This rotary disk has peripheral notches 20 for receiving guide ribs 21 extending longitudinally of the inner surface of the periphery of drum 4 so that it is thus possible for this disk to move along the guide ribs. Any suitable arrangement of openings 22 can be provided in the disk.

Figure 5:
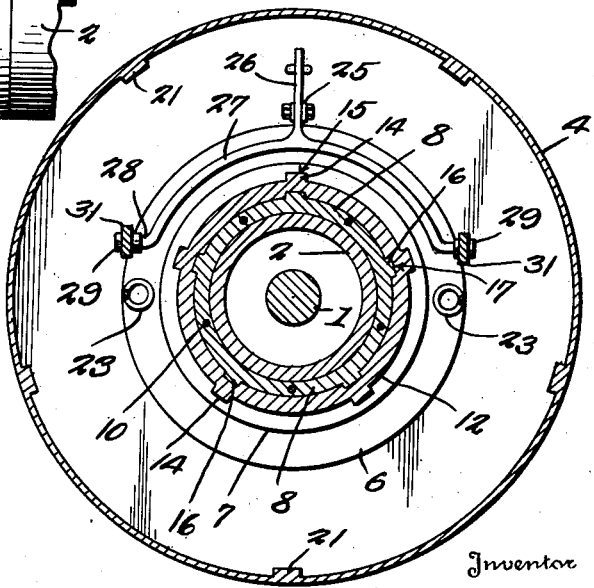
Figure 5 is a similar section taken on the line 5—5, Figure 3.

The disk 18 is held normally retracted from disks 19 and 9 by one or more springs 23 connected to ring 6 and to disk 18 as shown particularly in Figures 2 and 5. Thus the piston 11 is held normally pressed back within its cylinder or barrel 7, as shown in Figure 3.

The piston can be operated either by gas or fluid or by means of a hand or foot lever. For the purpose of directing fluid or the like into the cylinder, there is provided an inlet pipe 24 opening into the chamber 11. Obviously when fluid or gas under pressure is directed into said chamber the piston 12 will be shifted longitudinally so as to cause the disks 18 and 9 to tightly grip disk 19 between them and thus couple the drum 4 to the axle housing 2.

For the purpose of operating the brake by means of a lever or the like, a bracket 25 can be secured to ring 6, this bracket supporting a lever 26 having a yoke 27 which straddles the barrel or cylinder 7 and has oppositely extending alined terminals 28 carrying rollers 29 or the like. These rollers are seated in notches 30 in the ends of thrust arms 31 extending from the disk 18. Thus when the lever is moved in one direction by a rod 32 or the like, a thrust will be exerted from yoke 27 through arms 31 to the disk 18 with the result that said disk will be moved toward disk 9 and the two disks thus cooperate to tightly grip the interposed disk 19.

It has been found in practice that this brake will adjust itself automatically and, when applied, all pressure will be distributed evenly over the areas of the disks.

By providing the holes in the intermediate disk, air is free to circulate so as to keep the parts cool and, furthermore, any foreign substances adhering to the intermediate disk will be thrown therefrom by centrifugal force when the disks are separated, so that said disks are thus left substantially clean.

Importance is attached to the fact that while the brake ordinarily can be operated by hydraulic means or the like, it nevertheless has an emergency means including lever 26 whereby it can be applied by hand or foot power in the event of failure of the hydraulic means.

What is claimed is:

In a vehicle brake the combination with an axle housing and a flange thereon, of a ring bearing against the flange, a barrel extending therefrom and spaced from but concentric with the housing, a sleeve mounted on the housing and abutting against the ring, said sleeve and barrel cooperating to form an annular chamber, a disk abutting against the sleeve, means extending through the disk, sleeve, ring and flange for holding them together detachably, a tubular piston slidable within and guided by the annular chamber, a disk carried thereby and movable therewith, an apertured disk mounted between and normally spaced from the first named disk, tension springs outside of the barrel and connecting the ring to the disk of the piston thereby to hold said disk normally retracted from the interposed disk, thrust arms extending from the spring-restrained disk, an operating lever fulcrumed between the flange and said spring-restrained disk, means on the lever for engaging and transmitting thrust to the arms, a rotatable drum normally concealing the disk, springs and operating lever, and ribs on the drum slidably engaging the body of the opposed disk, for transmitting motion from the drum to said disk.

C. A. SNIDER.